United States Patent
Blum et al.

(10) Patent No.: US 9,876,403 B2
(45) Date of Patent: Jan. 23, 2018

(54) VIBRATION PREVENTION IN SYNCHRONOUS MACHINES

(71) Applicant: Bayerische Motoren Werke Aktiengesellschaft, Munich (DE)

(72) Inventors: Julian Blum, Bielefld (DE); Reinhard Doerfer, Munich (DE); Joerg Merwerth, Dachau (DE); Zhiwei Zheng, Munich (DE); Michael Schwarzer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 455 days.

(21) Appl. No.: 14/500,583

(22) Filed: Sep. 29, 2014

(65) Prior Publication Data

US 2015/0015107 A1     Jan. 15, 2015

Related U.S. Application Data

(63) Continuation-in-part of application No. PCT/EP2013/053299, filed on Feb. 20, 2013.

(30) Foreign Application Priority Data

Mar. 30, 2012  (DE) ........................ 10 2012 205 191

(51) Int. Cl.
*H02K 21/12* (2006.01)
*H02K 1/27* (2006.01)

(52) U.S. Cl.
CPC .................................. *H02K 1/276* (2013.01)

(58) Field of Classification Search
CPC ............................ H02K 1/276; H02K 1/2726
USPC ........................................ 310/156.01–156.84
See application file for complete search history.

(56) References Cited

U.S. PATENT DOCUMENTS

| | | | |
|---|---|---|---|
| 4,912,746 A | 3/1990 | Oishi | |
| 6,252,323 B1* | 6/2001 | Nishikawa | H02K 1/278 310/112 |
| 6,707,209 B2* | 3/2004 | Crapo | H02K 1/278 310/154.01 |
| 6,737,778 B2 | 5/2004 | Daikoku et al. | |
| 7,067,948 B2* | 6/2006 | Yamaguchi | H02K 1/278 310/156.47 |

(Continued)

FOREIGN PATENT DOCUMENTS

| | | |
|---|---|---|
| CN | 1361578 A | 7/2002 |
| CN | 1497818 A | 5/2004 |

(Continued)

OTHER PUBLICATIONS

Chinese Office Action issued in Chinese counterpart application No. 201380009966.5 dated Mar. 22, 2016, with partial English translation (Twelve (12) pages).

(Continued)

*Primary Examiner* — Hanh Nguyen
(74) *Attorney, Agent, or Firm* — Crowell & Moring LLP (57) ABSTRACT

Spatially mutually close pole components are offset with respect to one another such that their influences on a given harmonic of the vibrations occurring during operation cancel one another as much as possible. The present invention therefore suggests concepts and makes dimensioning proposals by means of which certain harmonic orders of the operating noise can be reduced.

15 Claims, 6 Drawing Sheets

(56) References Cited

U.S. PATENT DOCUMENTS

| | | |
|---|---|---|
| 7,196,445 B2 | 3/2007 | Yamaguchi et al. |
| 2005/0099082 A1 | 5/2005 | Nashiki |
| 2006/0006744 A1 | 1/2006 | Nashiki |
| 2006/0244336 A1 | 11/2006 | Makita et al. |
| 2007/0222319 A1* | 9/2007 | Yoshikawa ............ H02K 1/276 310/156.53 |
| 2009/0224621 A1 | 9/2009 | Okubo et al. |
| 2010/0052466 A1 | 3/2010 | Vollmer et al. |
| 2010/0277027 A1* | 11/2010 | Kaiser .................... H02K 1/276 310/156.47 |

FOREIGN PATENT DOCUMENTS

| | | |
|---|---|---|
| CN | 1799176 A | 7/2006 |
| CN | 201307792 Y | 9/2009 |
| DE | 103 48 401 A1 | 5/2004 |
| DE | 10 2004 053 488 A1 | 8/2005 |
| DE | 10 2005 032 069 A1 | 2/2006 |
| DE | 10 2006 019 462 A1 | 3/2007 |
| DE | 10 2006 033 718 A1 | 1/2008 |
| DE | 10 2009 001 174 A1 | 9/2009 |
| DE | 10 2010 049 054 A1 | 4/2012 |
| EP | 1 628 381 A1 | 2/2006 |
| EP | 1 870 983 A2 | 12/2007 |
| WO | WO 2008/009706 A1 | 1/2008 |
| WO | WO 2011/114574 A1 | 9/2011 |

OTHER PUBLICATIONS

Duane C. Hanselman, "Brushless Permanent-Magnet Motor Design", McGraw-Hill 1994, S. 8ff, S. 55ff und s. 117 (Eight (8) pages).

International Search Report dated May 15, 2014 (Two (2) pages).

German Search Report dated Jan. 11, 2013, with Statement of Relevancy (Six (6) pages).

Chinese Office Action issued in Chinese counterpart application No. 201380009966.5 dated Sep. 26, 2016, with English translation (Five (5) pages).

\* cited by examiner

VIBRATION PREVENTION IN SYNCHRONOUS MACHINES

CROSS REFERENCE TO RELATED APPLICATIONS

This application is a continuation of PCT International Application No. PCT/EP2013/053299, filed Feb. 20, 2013, which claims priority under 35 U.S.C. § 119 from German Patent Application No. 10 2012 205 191.0, filed Mar. 30, 2012, the entire disclosures of which are herein expressly incorporated by reference.

BACKGROUND AND SUMMARY OF THE INVENTION

The present invention relates to pole assemblies for the reduction or prevention of vibrations and particularly acoustic emissions of certain orders in the case of electric machines.

STATE OF THE ART

In electric rotary machines, an electric magnetic field between a rotor and a stator causes time-variant force effects by which the structure of the machine is incited to carry out vibrations and acoustic emissions.

In the state of the art, it is known to rotate in opposite directions the pole components of a pole, which are arranged behind one another in the axial direction and which may, for example, comprise iron sheets, so that a so-called "inclination" is formed. In other words, an inclination is an offset by a predefined degree of the pole components situated behind one another in the axial direction (usually indicated in degrees with respect to the rotating direction of the electric machine). In addition, it is known to change the shape of metal sheets situated behind one another in such a manner that the face, thus the surface by which the poles generate or experience a magnetic effect in the air gap of the machine, changes in the axial direction also independently of an offset by rotation. In this manner, the force effect of an inclined pole is, as it were, distributed in the rotating direction, which can advantageously influence local force maxima which result in a so-called "moment of detent". The inclination can be made in the rotor and/or the stator of the electric machine.

In particular, the so-called linear inclination, which describes an invariable offset of successive pole components in a preferred direction, as well as a symmetrical V-shaped offset are known. This is particularly due to the desired avoidance of magnetic stray flux which reduces the efficiency of the electric machine, while the mass remains the same or the expenditure of magnetic material remains the same. Particularly for reducing or avoiding especially interfering harmonic vibration components ("orders"), no satisfactory approaches have yet become known for systems from the state of the art that can be produced by means of satisfactory expenditures.

It is therefore an object of the present invention to provide an electric machine with a reduced tendency to vibrate.

It is a further object of the present invention to reduce particularly interfering components in the vibration behavior of an electric machine.

SUMMARY OF THE INVENTION

According to the invention, the above-mentioned object is achieved by a pole assembly, a rotor and an electric machine, as set forth in the independent claims. In the following, a pole assembly is a structure that, during the operation of an electric machine, generates or experiences a magnetic force effect in the air gap of the machine, in which case a pole of the electric machine may comprise one or more pole assemblies according to the invention. In this case, a pole assembly may have a number of pole components, of which the pole assembly is composed. A pole component may, for example, be an iron sheet or a stack of iron sheets, but, as an alternative or in addition, may also, for example, comprise a permanent magnet. In particular, within the scope of the present invention, a pole component may be a component that guides a portion of the magnetic flux by way of its face into the air gap of the electric machine or out of the electric machine.

According to the invention, the pole components of the pole assembly are provided in a minimal number of 4, but in practice may be provided in clearly higher numbers (for example, here, as 5, 6, 7, 8, 9, 10 pole components as well as in all integral numbers from 11 to 150). In this case, at least all pole components of the pole assembly, with the exception of one, are assigned to subassemblies which consist of mutually adjacent pole components. In other words, in the case of a number of X pole components of a pole assembly, for example, X-1 or X of the pole components can be assigned in subassemblies. Adjacent pole components relate to a spatial assignment such that essentially no additional magnetically effective elements are arranged between two adjacent pole components in the pole assembly. Therefore, in particular, pole components that are situated close to one another, particularly in a direct contact with one another, are considered to be adjacent. In particular, the layered stacks of iron sheets occurring in alternating-field machines should be mentioned whose two iron sheets rotated in opposite direction to one another may form the boundary between two pole components. It is further provided, according to the invention, that mutually-correspondingly-oriented face boundaries of the pole components of a subassembly are arranged such that, in each case, one minimum offset respectively is present between successive face boundaries of a subassembly. Depending on the design of the pole components, the face boundary may represent a clearly defined boundary of the face of a pole component. However, particularly in the case of faces that are very convex or very concave with respect to the air gap, an arbitrary meaningful definition of a face boundary can be used in order to meaningfully describe the relative arrangement of pole components of a pole assembly. According to the invention, mutually corresponding face boundaries of the pole components of a subassembly are therefore considered and it is required that between these face boundaries, one minimum offset respectively exists with respect to a nearest additional face boundary of the same subassembly. In this case, the offset V between two nearest face boundaries may be higher than the minimum offset $V_{min}$. The offset between the face boundaries of a subassembly is in each case in a common direction. In other words, pole components considered in an ascending sequence are rotated in the same direction compared to their respective precursor. According to the invention, it is provided that the amount of the minimum offset $V_{min}$ is at least by a factor of 1.5 larger than the amount of a comparison offset $V_{vergl}$. The following applies:

$$|V_{min}|=1.5*|V_{vergl}|$$

The comparison offset $V_{vergl}$ is computed as the maximally occurring relative offset of two pole components within a considered pole assembly (or of the pole, if the pole comprises only one pole assembly), which is divided by the number X reduced by 1 of pole components contained in the pole assembly. In other words, the maximal offset $V_{max}$ (for example, an angle of 4°) within a pole assembly is divided by X−1). This number of pole components is computed as the total number X of the pole components contained in the pole assembly "reduced by 1". The following applies:

$$V_{Vergl} = V_{max}/(X-1)$$

This comparison offset is significantly higher than it occurs, for example, in linear inclinations of the state of the art. In addition, within a pole assembly, no further pole component exists with respect to more than half of the present pole components, with respect to which these pole components have an offset of 0°. In other words, in the case of a number of X pole components, at least (X/2)+1 different offset positions exist for pole components of the pole assembly. In addition, it is provided that the offset direction between two mutually successive pole components respectively within the pole assembly changes at least twice. In other words, in the axial direction, a second pole component is situated behind a first pole component, which second pole component is rotated into a first direction with respect to the first pole component. Behind this second, rotated pole component a second pole component is, in turn, situated which is rotated into a second (opposite) direction with respect to the first rotated pole component. A further pole component follows the third pole component, which further pole component is rotated in the first direction with respect to the third pole component. As indicated above, the above-discussed embodiment of the present invention relates to pole assemblies having a number of at least 4 pole components.

According to a further aspect of the present invention, a pole assembly for a pole of an electric machine is suggested, in the case of which the pole assembly consists of two subassemblies of pole components, and maximally one pole component is assigned to none of the subassemblies. The first subassembly therefore consists of a first number of pole components which, as indicated in connection with the first aspect of the present invention, are arranged adjacent to one another. In other words, essentially no magnetically effective material is therefore situated between the pole components of the first subassembly or between the pole components of the second subassembly. With respect to the faces of the pole components, reference is made to the above explanations. Between all mutually correspondingly oriented face boundaries of the pole components of the first subassembly, there is in each case a minimum offset in a common first direction. Between all mutually correspondingly oriented face boundaries of the pole components of the second subassembly, there is also a respective minimum offset in a second direction (opposite the first direction). In this case, the amount of the minimum offset is to be computed, as stated in connection with the above-discussed first aspect of the present invention. Within the considered pole assembly, no additional pole component with a relative offset of 0° exists with respect to more than half of the pole components. Further, the first subassembly comprises at least two pole components, and the second subassembly comprises at least three pole components. Furthermore, the first direction is oriented opposite the second direction. The arrangement of pole components of a pole assembly according to the invention, as described in connection with the two above-mentioned aspects of the present invention, has the effect that interfering harmonic vibration components during the operation of the electric machine can clearly be reduced in comparison to the state of the art.

The dependent claims relate to preferred further developments and advantageous embodiments of the present invention.

The pole components may preferably have faces, which are identical for each of the pole components. The offset between mutually corresponding face boundaries, as used above for defining the relative arrangement of the pole components, is in this case created by an offset of the faces of the pole components. In other words, during the construction of the pole assembly according to the invention, the pole components are rotated in mutually opposite directions. This facilitates the production and reduces the required tool variety for the manufacturing of the pole assembly according to the invention.

According to a further development of the present invention, the faces of the pole components may all have the same size and shape. In particular, the pole components or their elements can in each case be produced by one and the same tool, whereby the variety of tools is reduced that are necessary for manufacturing the pole assembly according to the invention. Furthermore, the manufacturing process is simplified in that the elements or pole components can be layered in an almost arbitrary sequence without having a negative influence on the method of operation of the pole assembly. However, in this case, size and shape does not mean that, for example, bores to be used for fixing the pole components cannot vary by way of the pole components in order to, for example, simplify the producing of an offset during the mounting.

As an alternative, the pole components may have different thicknesses and/or a completely different size and/or shape. It thereby becomes possible, particularly while the thickness or size or shape of the pole components of a subassembly remain the same, to have further influence on the vibrations occurring during the operation of the electric machine.

The faces of each pole component may preferably have four face boundary sections that are parallel in pairs. In other words, the face boundary sections of the pole component faces, that are mutually adjacent in the layering direction (with respect to the electric machine, thus, the axial direction), are supplemented by two mutually parallel face boundary sections, which move ahead of or behind the face in the rotating direction. In particular, these last-mentioned face boundary sections may extend in the layering direction of the pole components of the pole assembly, whereby the face is bounded at a right angle. This reduces the magnetic stray flux and the manufacturing expenditures.

The pole components may each preferably comprise a plurality of identical iron sheets which, in particular, are arranged in a congruent fashion. The use of iron sheets reduces induced eddy currents within the pole components, and a congruent arrangement reduces the magnetic stray flux as well as the manufacturing expenditures.

According to a further aspect of the present invention, a rotor is described for an electric machine, which rotor comprises a number of pole assemblies, as they are described in detail above, the offset of the face boundaries of the pole components of a subassembly preferably amounting to $(8/P)°$ to $(18/P)°$, particularly $(10/P)°$ to $(17/P)°$ and preferably $(15/P)°$. A person skilled in the art knows that P is the number of pairs of poles. Correspondingly, a number of 2 P pole assemblies are obtained for the rotor, which have a certain offset with respect to one another as a function of the number of pairs of poles P. The numerical values indicated here describe the mechanical offset of the pole components with respect to one another.

According to a further aspect of the present invention, an electric machine is provided which may be further developed particularly as a synchronous machine excited as a permanent magnet and/or as an alternating-field machine (for example, an alternating-current machine, a three-phase current machine, a polyphase machine). In particular, these machines can be used as drive assemblies for the automobile industry. According to the invention, the electric machine comprises at least two poles, which may be arranged in the rotor of the machine and/or in the stator of the machine, each pole containing at least one pole assembly, as was described in detail above. In particular, the electric machine may contain a rotor, as it was described in connection with the preceding aspect of the present invention.

The above-mentioned characteristics and aspects of the present invention will be described in detail in the following by means of the attached drawing figures.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1A:
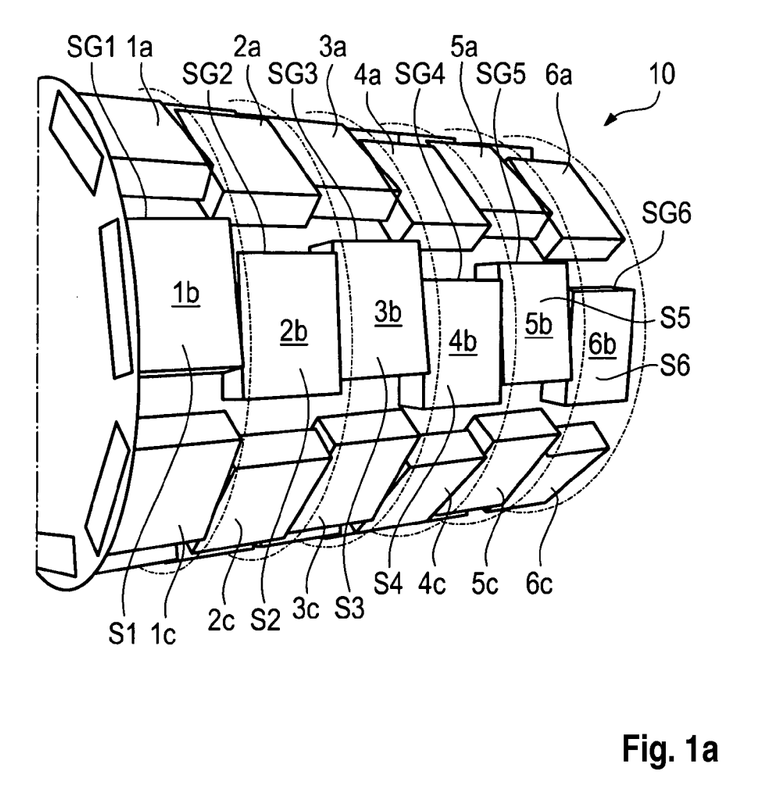
FIG. 1a is a rotor of an electric machine in which only the segments of pole components oriented in the direction of the air gap are shown.

FIG. 1a illustrates a rotor 10 of an electric machine, in which only the segments of the pole components 1a, b, c to 6a, b, c are shown which are oriented in the direction of the air gap. Primarily, three mutually successive pole assemblies a, b, and c are visible, which are arranged in a mutually successive manner on a cylinder surface of the rotor 10. Since the relative arrangement of the pole components on each pole assembly may essentially be identical or repetitive, only the pole assembly b will be discussed in the following. The pole assembly b consists of pole components 1b, 2b, 3b, 4b, 5b and 6b, which, being mutually adjacent in the axial direction, face a (not shown) air gap of an electric machine. In particular, the faces $S_{1-6}$ illustrated as rectangles, for reasons of simplicity, are shown as plane surfaces which, in the practical application, for reducing the air gap depth of the imagined cylinder surface of the rotor can be developed correspondingly. The pole component 2b has an offset in a first direction with respect to the pole component 1b, while the pole component 3b has an offset in a second direction with respect to the pole component 2b, etc. In other words, the pole components 1b to 6b are rotated with respect to one another alternately in different directions, which, during the operation of the rotor, would correspond to a direction situated in the rotating direction or against the rotating direction. As a result of this rotation, an offset is created by which the different pole components would essentially generate or experience essentially identical magnetic force effects with respect to a not inclined stator at different points in time or rotating positions of the rotor. The face boundary $SG_1$ to $SG_6$ which, in each case, points into the second rotating direction as well as its face boundary, in each case, situated opposite thereto in the opposite direction, in pairs, form parallel face boundary sections which are oriented in the layering direction of the pole components—or in other words—perpendicular to the rotation direction of the electric machine. The remaining face boundary sections of the illustrated pole components are oriented perpendicular to the layering direction or in the rotation direction of the illustrated rotor 10.

Figure 1B:
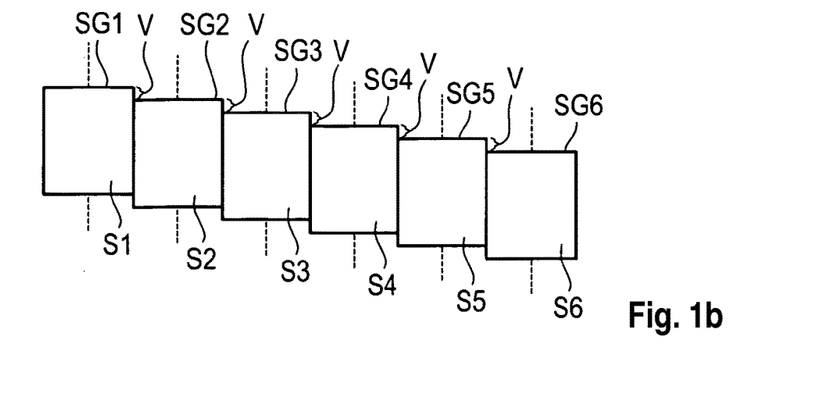
FIGS. 1b and 1c are schematic views of known arrangements of pole components.

FIG. 1b illustrates a schematic arrangement of pole components, as a so-called "linear inclination". The faces $S_1$ to $S_6$ of the pole components 1 to 6 are offset with respect to one another in a common direction (in the figure, oriented downward toward the right) by a constant offset V. In the case of a typical offset between the pole components 1 to 6 of 25°/P, the five offsets between the six illustrated pole components would amount to 5°/P respectively. Since the illustrated pole components 1 to 6 have identical faces $S_1$ to $S_6$, the offset of the face boundaries $SG_1$ to $SG_6$ corresponds to the offset of the faces $S_1$ to $S_6$. The illustrated arrangement is used in the state of the art in order to reduce the detent moment and ripple moment. In this case, it is assumed in the state of the art that the rotor shaft, or the overall structure of the power-guiding parts of the electric machine, is rigid, which may be permissible in a first approximation but ignores the optimization potential or conceivable savings of material.

Figure 1C:
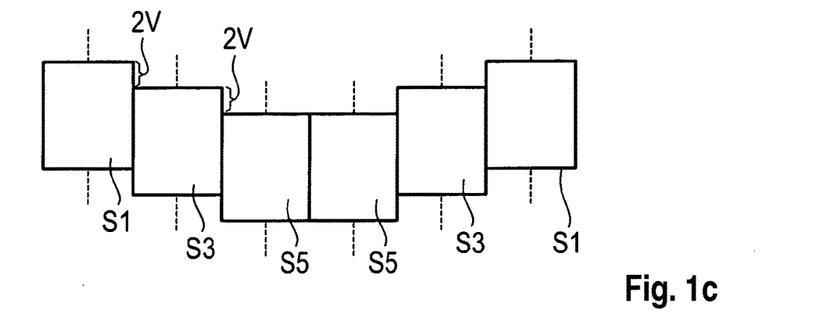

FIG. 1c shows an alternative schematic arrangement of pole components of a pole assembly of the state of the art, which is indicated to be "V-inclined". An offset 2V exists between a first pole component 1 and a second pole component 3; likewise between a third pole component 5 and the second pole component 3. The fourth pole component (also 5) has no offset with respect to the third pole component 5. The fifth pole component 3 and the sixth pole component 1 each have an offset 2V in the opposite direction with respect to their precursor. For the purpose of an illustration, the pole components will be continuously numbered in an ascending fashion in the attached drawing figures, as they would be rotated past an identical position at the stator of an electric machine in a time sequence.

Figure 2:
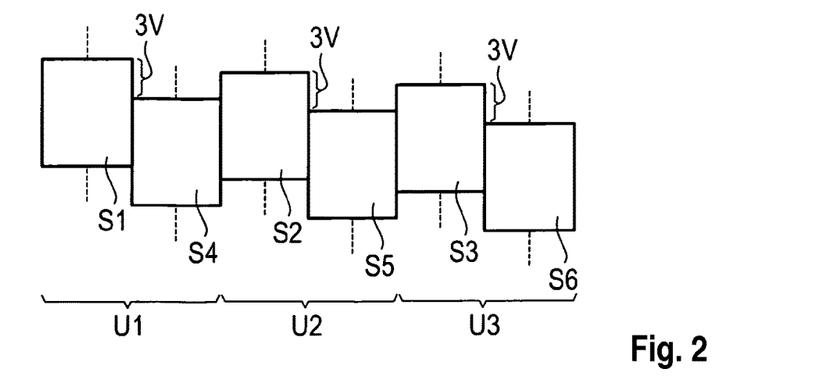
FIGS. 2 to 11 are schematic views of arrangements according to the invention of pole components within a pole assembly.

FIG. 2 illustrates a schematic arrangement of pole components of a pole assembly according to the first aspect of the present invention. The pole components 1 to 6 are arranged in subassemblies $U_1$ to $U_3$, within which the respectively contained pole components have an offset of 3V. Therefore, the offset of 3V is present in one and the same direction between the pole components 1 and 4 of the subassembly $U_1$ we as well as between the pole components 2 and 5 of the subassembly $U_2$ and between the pole components 3 and 6 of the subassembly $U_3$. The mutually adjoining pole components of different subassemblies, specifically the pole components 4 and 2 or 5 and 3, mutually opposite, have an offset 2V oriented in the opposite direction. In other words, an average inclination of the entire pole assembly is superimposed on an offset of the pole components that is larger but is oriented in the same direction within a respective subassembly.

Figure 3:
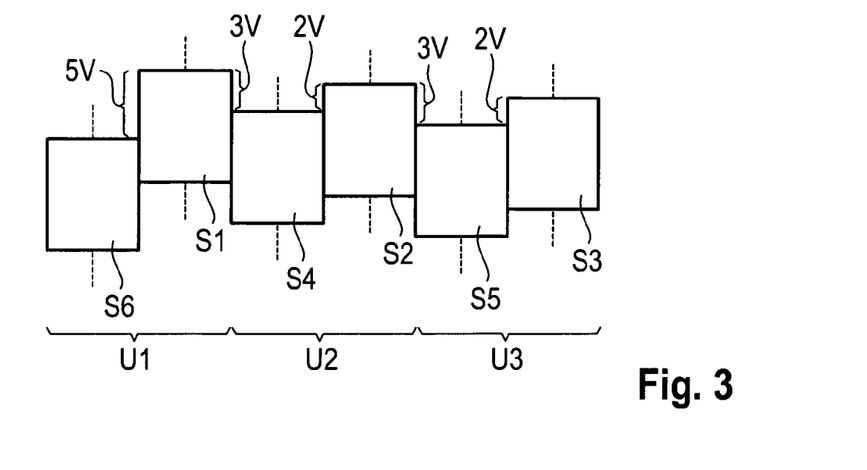

FIG. 3 illustrates the schematic arrangement shown in FIG. 2, in the case of which, however, the pole component 6 was placed ahead of the pole component 1. The pole components 6 and 1 therefore form mutually adjacent pole components of a subassembly $U_1$ which are offset by 5V with respect to one another. While no change took place in the relative assignment of the remaining pole components 1 to 5, the pole components 4 and 2 are now arranged with respect to one another as subassembly $U_2$ as well as the pole components 5 and 3 are now arranged with respect to one another as subassembly $U_3$. However, the minimum offset between two pole components within a subassembly required according to the invention is still recognizably maintained.

Figure 4:
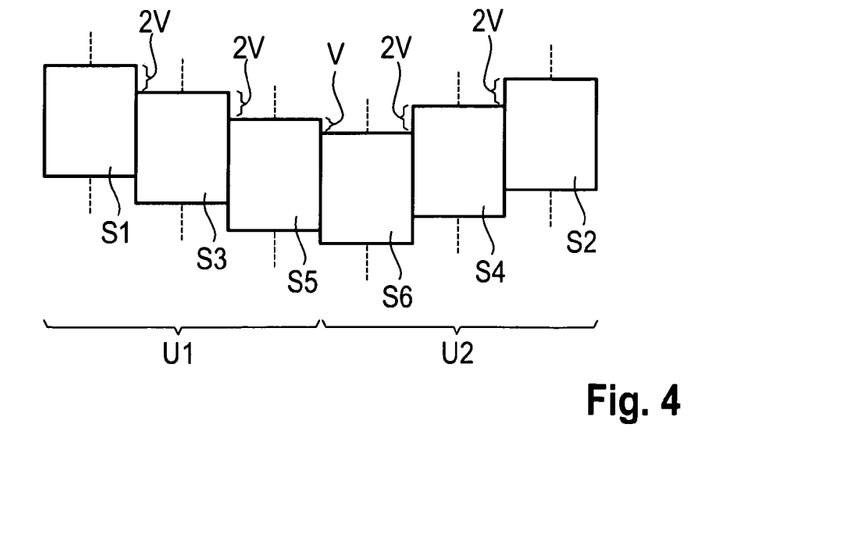

FIG. 4 illustrates an embodiment according to the second aspect of the present invention, in which a V-shaped arrangement of the pole components 1 to 6 is used. The pole components 1, 3 and 5 of the subassembly $U_1$ are each offset with respect to one another in a first direction by an offset 2V. The fourth pole component 6 adjoins the third pole component 5 with an offset V, which is oriented in the same direction as the pole components 1, 3, and 5 of the subassembly $U_1$ are offset with respect to one another. The pole components 6, 4 and 2 of the second subassembly $U_2$ are also each offset by an offset 2V with respect to one another. However, the latter is oriented in the opposite direction.

Figure 5:
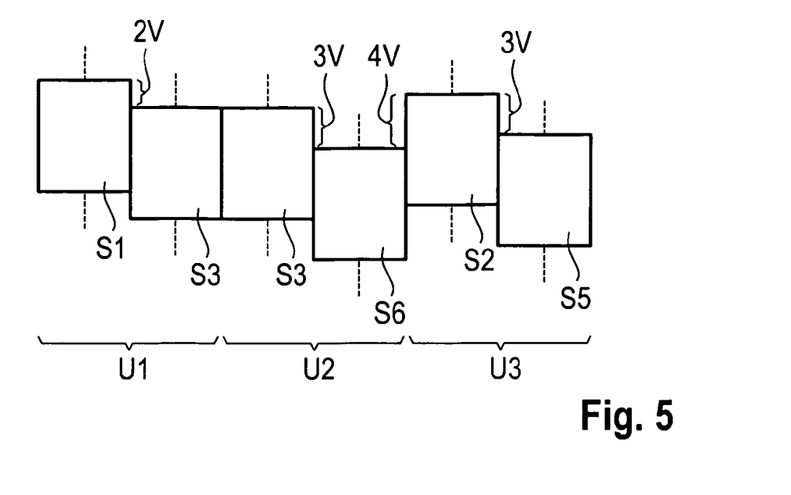

FIG. 5 illustrates a further conceivable schematic arrangement of 6 pole components according to the first aspect of the present invention. Here, the 6 pole components 1 to 6 are combined in subassemblies $U_1$ to $U_3$, and, within the subassemblies $U_1$ and $U_3$, have an offset of 2V (subassembly $U_1$) or an offset of 3V (subassemblies $U_2$ and $U_3$) in the respective identical direction. In contrast to the arrangement illustrated in FIG. 2, the mutually adjoining pole components 3 of subassemblies $U_1$ and $U_2$ are not offset with respect to one another. In other words, they have an offset of 0° with respect to one another. The illustrated arrangement reduces magnetic stray fluxes between the second and the third pole component 3. In addition, as a result of the illustrated arrangement, a respective inclination of the pole components within a subassembly $U_1$ to $U_3$ is superimposed on an alternating offset direction of the subassemblies $U_1$ to $U_3$ with respect to one another. In other words, the subassembly $U_2$ is offset with respect to subassembly $U_1$ in a first direction, while the third subassembly $U_3$ is offset with respect to the second subassembly $U_2$ into a second (opposite) direction.

Figure 6:
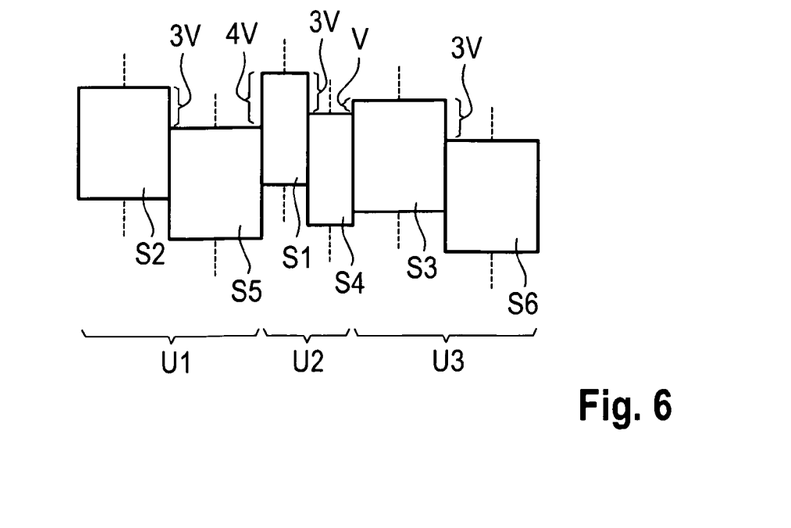

FIG. 6 is a further schematic view of a conceivable further development of the pole assembly according to the first aspect of the present invention, in which the pole components 1 and 4 of the subassembly $U_2$ have a reduced thickness and therefore narrower faces in the layering direction. The forces on the 6 pole components occurring during the operation are nevertheless advantageously compensated in that pole components acting in opposite directions upon certain harmonic vibration orders, specifically the pole components of each subassembly $U_1$ to $U_3$, not only generate or experience a suitable offset but also a similar magnetic effect, as far as its amount is concerned.

Figure 7:
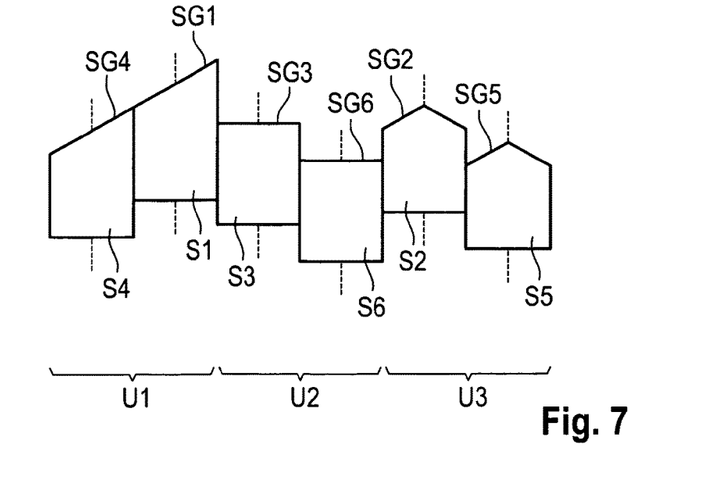

FIG. 7 is a view of a schematic arrangement of pole components 1 to 6, which have alternative face geometries. For example, the face boundaries $SG_4$ and $SG_1$ pointing into a first rotating direction of the rotor have an inclined design, on the one hand, with respect to the layering direction of the pole components 1 to 6 as well as with respect to the rotating direction of the rotor. In this case, both face boundaries $SG_1$ and $SG_4$ have an identical inclination which, despite the invariable or maintained offset between the pole components 1 and 4 seamlessly transition into one another. In contrast, the pole components 2 and 5 of the subassembly $U_3$ each have roof-shaped or arrow-shaped face boundaries $SG_2$ and $SG_5$. The illustrated variants for the face boundaries represent further variation possibilities in order to, on the one hand, influence the magnetic stray flux and the detent moment as well as the vibration behavior on the other hand.

Figure 8:
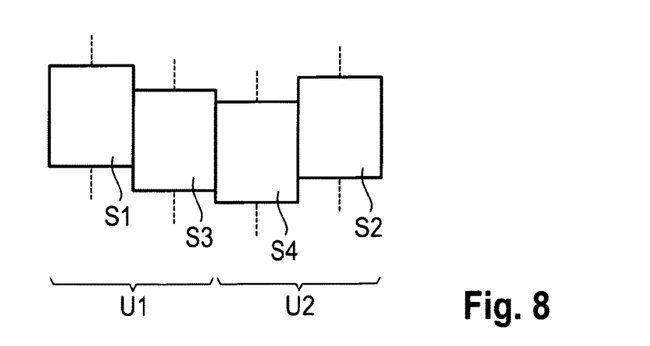

FIG. 8 is a schematic view of a pole assembly according to the second aspect of the present invention, which shows only four pole components 1 to 4, which are divided into two subassemblies $U_1$ and $U_2$. While the pole component 3 has an offset of 2V with respect to the pole component 1 in a first direction, an offset of 2 is provided in an opposite direction between pole component 2 and pole component 4. In other words, the offsets within subassemblies $U_1$ and $U_2$ are oriented against one another. In addition, the pole component 4, which is part of subassembly $U_2$, has an offset V in the first direction with respect to pole component 3, which is part of subassembly $U_1$.

Figure 9:
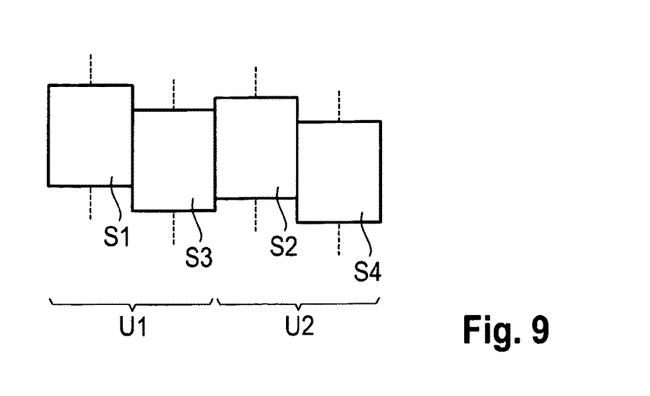

FIG. 9 illustrates a schematic arrangement of four pole components 1 to 4 according to the first aspect according to the invention. The four pole components 1 to 4 are divided into two subassemblies $U_1$ and $U_2$, in which case the pole components 3 and 4 respectively have an offset 2V in a common direction with respect to the pole components 1 and 2 respectively. However, the pole components 2 and 3, by which the subassemblies $U_1$ and $U_2$ adjoin one another, are offset in an opposite direction with respect to one another.

Figure 10:
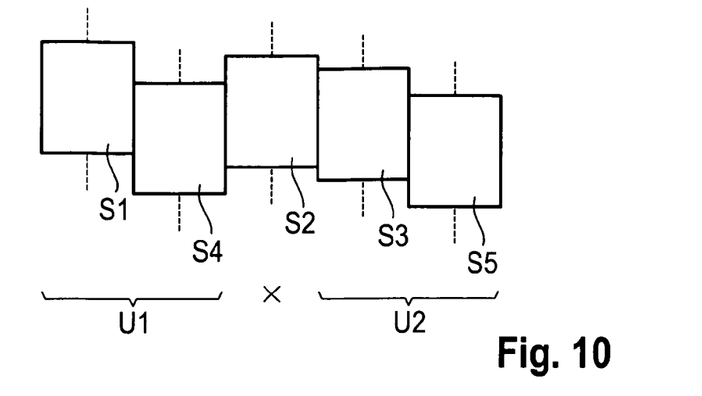

FIG. 10 is a further schematic view of a pole assembly of the invention according to the first aspect of the present invention. The two pole components 1 and 4 of the first subassembly $U_1$ as well as the pole components 3 and 5 of the second subassembly $U_2$ have an offset of 3V and 2V respectively in a first direction with respect to one another. The mutually facing pole components 4 and 3 of subassemblies $U_1$ and $U_2$ have an offset of 1 in the opposite direction with respect to one another. However, a pole component 2 that cannot be assigned to any of the subassemblies is arranged between these pole components 4 and 3. In other words, the offset between pole component 2 and pole component 3 is not large enough in order to be able to assign it, according to the invention, to the subassembly $U_2$. In addition, with respect to the pole components 1 and 4 contained in subassembly $U_1$, pole component 2 has an offset direction in the opposite orientation. Nevertheless, a pole component can be used which can be assigned to none of the subassemblies, in order to, on the one hand, increase the maximally deliverable power of an electric machine and, on the other hand, influence in a targeted manner further fractions in the vibration spectrum during the operation.

Figure 11:
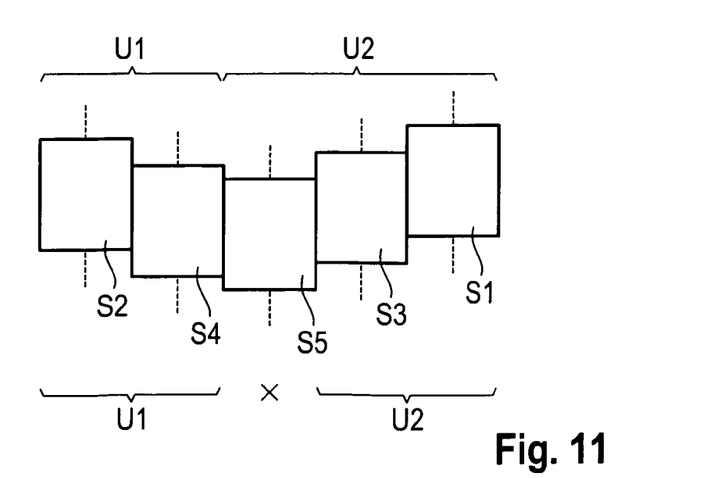

FIG. 11 illustrates a further schematic arrangement of a pole assembly of the invention according to a second aspect of the present invention. The five pole components 1 to 5 can either be divided completely into two subassemblies $U_1$, containing the pole components 2 and 4, as well as $U_2$, containing the pole components 5, 3 and 2, or only the pole components 3 and 1 are assigned to the subassembly $U_2$, in which case the pole component 5 remains outside the subassemblies $U_1$ and $U_2$. Here, the pole components 2 and 4 have an offset 2V in a first direction with respect to one another, while the pole components 5 and 3 or 3 and 1 each have an offset 2V with respect to one another in a second direction. Although the mutually adjoining pole components 4 and 5 have an offset V in the first direction with respect to one another, its amount is not sufficient to be able to assign it to the first subassembly $U_1$. The pole component 5 can therefore be assigned to the second subassembly $U_2$ or be understood without an assignment to a subassembly group in the pole assembly according to the invention.

It is a central idea of the present invention to provide, with respect to certain harmonic vibrations, suitable pole assemblies or rotors or electric machines, in the case of which pole components situated spatially close to one another have opposite effects with respect to the arising of certain harmonics. For this purpose, an offset of adjacent pole components is required which clearly exceeds the offset known from the state of the art. In this case, an increase of the magnetic stray flux and a reduced achievable power, while the magnetic mass is the same, are intentionally accepted in order to positively influence the vibration behavior of an electric machine. The person skilled in the art recognizes in this case that the offset of the pole components to be selected depends on many parameters which influence one another. For example, the number of rotor pole pairs and the number of stator pole pairs is decisive for the maximal relative offset between the relative maximal offset of pole components occurring within a pole assembly. In addition, the relative offset of two pole components adjacent according to the invention depends on that vibration order of the overall system that is to be reduced in each case. Therefore, only as an example, an angle of 3.75° occurring in the case of a number 4 rotor pole pairs between the pole components of a subassembly is mentioned as a suitable offset in order to significantly reduce the $48^{th}$ harmonic.

The invention is based, among others, on the recognition that the assumption of a rigid shaft or machine structure applies only conditionally also with respect to the taking into account of high harmonic orders of an electric machine. The present invention therefore suggests concepts as well as makes dimensioning proposals by means of which certain harmonic orders of the operating noise can be reduced.

LIST OF REFERENCE SYMBOLS 1 to 6 Pole components
10 Rotor
a,b,c Pole assemblies
$S_1$ to $S_6$ Faces
$SGA_1$ to $SGA_6$ Face boundary sections
$SG_1$ to $SG_6$ Face boundary
$U_1$ to $U_3$ Subassembly
V Offset
$V_{min}$ Minimum offset
$V_{max}$ Maximally occurring relative offset
$V_{vergl}$ Comparison offset
X Number of pole components per pole assembly The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A pole assembly for a pole of an electric machine, wherein the pole assembly comprises:
   a sequence of n pole components arranged in an axial direction, each pole component including a face defining a face boundary;
   one or more subassemblies,
   wherein each subassembly includes at least two pole components of the sequence,
   wherein the pole components of each subassembly are sequentially adjacent in the axial direction,
   wherein at least n−1 pole components are assigned to the one or more subassemblies,
   wherein adjacent face boundaries of the pole components within each subassembly are offset from each other in a common circumferential direction by at least a minimum offset that is at least 1.5 times larger than a comparison value,
   wherein an offset direction of adjacent face boundaries of the pole assembly changes at least twice along the sequence of pole components,
   wherein no more than half the pole components of the pole assembly have no offset with respect to respective adjacent boundary faces,
   wherein the comparison value is a maximally occurring relative offset of two pole components divided by n−1, and
   wherein n is at least four.

2. The pole assembly according to claim 1, wherein an offset between adjacent face boundaries is created by offsetting corresponding faces of the pole components by at least the minimum offset.

3. A rotor for an electric machine comprising 2P pole assemblies according to claim 2, wherein the offset of the face boundaries of the pole components of a subassembly amounts to between (8/P) degrees and (18/P) degrees, wherein P is the rotor pole pair number.

4. The rotor according to claim 3, wherein the offset of the face boundaries of the pole components of a subassembly amounts to between (10/P) degrees and (17/P) degrees.

5. The pole assembly according to claim 1, wherein the faces of the pole components all have the same size and shape, and/or pole components of one subassembly have a different size and/or shape than that of another subassembly.

6. The pole assembly according to claim 1, wherein the faces of each pole component have four face boundary sections which are parallel in pairs and of which two extend essentially in a direction perpendicular to the direction of the offsets between the pole components.

7. The pole assembly according to claim 1, wherein the pole components each have a plurality of identical iron sheets arranged in a congruent manner.

8. An electric machine configured as a synchronous machine excited as at least one of a permanent magnet and an alternating-field machine, wherein the electric machine comprising at least two poles arranged in at least one of a rotor and a stator of the electric machine, wherein the at least two poles comprise at least one pole assembly according to claim 1.

9. A pole assembly for a pole of an electric machine, the pole assembly comprising:
   a sequence of n layered pole components arranged in an axial direction, each layered pole component having a face defining a face boundary;
   a first subassembly of exactly two subassemblies of the sequence, the first subassembly including: at least two layered pole components whose sequentially adjacent face boundaries are offset from each other in a first circumferential direction by at least a minimum offset that is 1.5 times a comparison value; and
   a second subassembly of the exactly two subassemblies of the sequence, the second subassembly including: at least three layered pole components whose sequentially adjacent face boundaries are offset from each other by at least the minimum offset in a second circumferential direction opposite the first direction,
   wherein at least n−1 pole components are assigned to either the first subassembly or the second subassembly,
   wherein no more than half the layered pole components of the pole assembly have no offset with respect to respective adjacent boundary faces, and
   wherein the comparison value is a maximally occurring relative offset of two layered pole components divided by n−1.

10. The pole assembly according to claim 9, wherein an offset between adjacent face boundaries is created by offsetting corresponding faces of the pole components by at least the minimum offset.

11. A rotor for an electric machine comprising 2P pole assemblies according to claim 10, wherein the offset of the face boundaries of the pole components of a subassembly amounts to between (8/P) degrees and (18/P) degrees, wherein P is the rotor pole pair number.

12. The rotor according to claim 11, wherein the offset of the face boundaries of the pole components of a subassembly amounts to between (10/P) degrees and (17/P) degrees.

13. The pole assembly according to claim 9, wherein the faces of the pole components all have the same size and shape, and/or pole components of the first subassembly have a different size and/or shape than that of the second subassembly.

14. The pole assembly according to claim 9, wherein the faces of each pole component have four face boundary sections which are parallel in pairs and of which two extend essentially in a direction perpendicular to the direction of the offsets between the pole components.

15. The pole assembly according to claim 9, wherein the pole components each have a plurality of identical iron sheets arranged in a congruent manner.

\* \* \* \* \*